US012785825B2

(12) United States Patent
Lal et al.

(10) Patent No.: US 12,785,825 B2
(45) Date of Patent: Nov. 3, 2026

(54) METHODS AND SYSTEMS FOR ENHANCING THE PERFORMANCE AND MANAGEMENT OF Wi-Fi NETWORKS

(71) Applicant: Adeia Guides Inc., San Jose, CA (US)

(72) Inventors: Dhananjay Lal, Englewood, CO (US); Serhad Doken, Bryn Mawr, PA (US)

(73) Assignee: Adeia Guides Inc., San Jose, CA (US)

( * ) Notice: Subject to any disclaimer, the term of this patent is extended or adjusted under 35 U.S.C. 154(b) by 334 days.

(21) Appl. No.: 18/667,901

(22) Filed: May 17, 2024

(65) Prior Publication Data

US 2025/0317222 A1 Oct. 9, 2025

Related U.S. Application Data

(60) Provisional application No. 63/574,662, filed on Apr. 4, 2024.

(51) Int. Cl.

| | |
|---|---|
| ***H04L 12/00*** | (2006.01) |
| ***H04B 17/309*** | (2015.01) |
| ***H04W 4/12*** | (2009.01) |

(52) U.S. Cl.

CPC ............ *H04B 17/309* (2015.01); *H04W 4/12* (2013.01)

(58) Field of Classification Search

CPC ....... H04B 17/309; H04B 7/155; H04W 4/12; H04W 80/06; H04W 4/60; H04W 4/40; H04W 4/14; H04W 36/0066; H04W 72/542; H04W 24/00; H04W 8/04; H04L 1/0015; H04L 65/80

USPC ......................................... 370/252, 241, 329

See application file for complete search history.

(56) References Cited

U.S. PATENT DOCUMENTS

| | | | | |
|---|---|---|---|---|
| 9,351,136 | B1 * | 5/2016 | Nautiyal | H04W 4/14 |
| 9,974,044 | B2 * | 5/2018 | Rao | H04L 65/80 |
| 10,715,969 | B1 * | 7/2020 | Bonn | H04W 4/60 |
| 10,958,333 | B2 * | 3/2021 | Hwang | H04B 7/155 |
| 12,464,552 | B2 * | 11/2025 | Kusashima | H04W 72/542 |
| 2005/0277431 | A1 * | 12/2005 | White | H04W 8/04 455/433 |

(Continued)

OTHER PUBLICATIONS

Ding, J., Wang, Y., “WiFi CSI-Based Human Activity Recognition Using Deep Recurrent Neural Network,” IEEE Access, 7:174257-174269 (2019).

(Continued)

*Primary Examiner* — Frantz Coby

(74) *Attorney, Agent, or Firm* — HG Law LLP

(57) ABSTRACT

Methods and systems for detection and communication of wireless broadband degradation involve comparing time-series data obtained from wireless sensing with time-series data representing changes in a measure of the quality of service offered by a wireless link. The wireless sensing time-series data is analyzed to detect physical activity in the vicinity of a wireless router, extender, or mesh unit, for instance. If the analysis reveals a correlation between a period of volatility in the time-series data obtained from wireless sensing with a time of a persistent change in the quality of service over a link involving the wireless router, extender or mesh unit, then an alert is transmitted to a provider or user of the wireless network. The alert may indicate that human action may have resulted in the change in quality of service. The user may then take action to reverse the human action if required or desired.

20 Claims, 9 Drawing Sheets

(56) References Cited

U.S. PATENT DOCUMENTS

| | | | | |
|---|---|---|---|---|
| 2007/0049266 | A1 * | 3/2007 | Voss | H04W 24/00 455/423 |
| 2013/0176854 | A1 * | 7/2013 | Chisu | H04W 80/06 370/241 |
| 2018/0098238 | A1 * | 4/2018 | Saxena | H04W 36/0066 |
| 2018/0131475 | A1 * | 5/2018 | Bergman | H04L 1/0015 |
| 2023/0217227 | A1 * | 7/2023 | Maschue | H04W 4/40 370/329 |

OTHER PUBLICATIONS

Ma, Y., et al., "WiFi Sensing with Channel State Information: A Survey," ACM Comput. Surv., 52:(3) Article 46:1-36 (2019).

Patel, R.K., et al., "High-Speed sensing of RF signals with phase change materials," [retrieved from https://arxiv.org/pdf/2312.06459.pdf on Aug. 6, 2024], 16 pages (2023).

Tao, Y., et al., "Radio Frequency Temperature Measurement System Based on PDC Material," J. Phys : Conf. Ser., 1651:012065, 8 pages (2020).

Vouzis, P., "What is the MCS Index?", WiFi monitoring, [retrieved from URL: https://netbeez.net/blog/what-is-mcs-index/ on Aug. 6, 2024), 7 pages (2020).

* cited by examiner 508 510 512 514

| Room | Objects | Object Locations |
|---|---|---|
| Living Room | AP1; TV; TV Stand; Coffee Table; Couch; Armchair 1; Armchair 2 | {X, Y, Z}; ... |
| Bedroom 1 | AP2; Bed; Desk; End table; Cabinet; Camera, Tablet | {X, Y, Z}; ... |
| Bedroom 2 | AP3; Bed; Cabinet; End Table; Alarm | {X, Y, Z}; ... |
| Kitchen | AP4; Kitchen Table; Cabinet | {X, Y, Z}; ... |
| Bathroom | N/A (CSI Data not Needed) | {X, Y, Z}; ... |
| Front Patio | Camera 1; Camera 2; Doorbell | {X, Y, Z}; ... |

METHODS AND SYSTEMS FOR ENHANCING THE PERFORMANCE AND MANAGEMENT OF Wi-Fi NETWORKS

BACKGROUND

The present disclosure relates to methods and systems for enhancing the performance and management of wireless networks.

SUMMARY

Wi-Fi has been evolving quickly with newer releases, such as Wi-Fi 6, Wi-Fi 6E, and Wi-Fi 7. A key trend in this evolution is the utilization of higher frequency unlicensed bands due to saturation of lower frequency bands as well as to achieve higher data rates. Shifting traffic to higher bands, however, reduces range of RF communication. Wireless Wi-Fi systems (such as mesh networking systems) with multiple routers or access points that communicate with one another to create a common wireless network will likely become more prevalent with the need for wireless connectivity at higher bit rates throughout relatively large areas (e.g., a home, a retail space, or office building).

With wireless mesh networking systems' installation, for instance, a customer or Internet Service Provider (ISP) installer places multiple Wi-Fi units (e.g., mesh nodes, routers, repeaters, access points, etc.) within the space. A technician or customer may perform the installation (placement of the Wi-Fi mesh units) and verify good coverage for clients that are connected or may connect to the wireless network. However, the customer may, at any later time, change the placement of the Wi-Fi mesh units for a variety of reasons, or changes to the space or environment may otherwise impact wireless coverage. Changes to the environment could include remodelling a space, reconfiguring furniture placement or moving a unit for protecting it from physical harm or for aesthetics. Other inadvertent changes such as unplugging or knocking down a mesh unit may also occur.

In some examples, there is provided a method to monitor a backhaul network for a Wi-Fi system and to correlate changes in throughput to the changes to the environment, such as caused by detected physical activity e.g., by a human/pet or other activity. Illustrative processes may include: periodically monitoring throughput between the mesh Wi-Fi routing units to ensure that throughput is stable; periodically performing RF sensing at each of the mesh Wi-Fi units; correlating time-series data for throughput between mesh Wi-Fi units and sensed activity at each of the mesh Wi-Fi units; creating a certificate of a configuration of mesh Wi-Fi in the home when throughput is stable; and/or messaging the customer about physical activity or other environment changes at/around a mesh Wi-Fi unit that resulted in significant changes to the achievable throughput on the mesh Wi-Fi backhaul network.

According to a first aspect of the disclosure, a method of alerting a user to physical influence on a wireless communications link between a first access point and a second access point is provided. The method may comprise detecting a period of physical activity in the vicinity of the first access point by sampling values of the physical characteristic of a wireless communication link between the first access point and a second access point, and analyzing the sampled values of the physical characteristic. In addition to sampling values of the physical characteristic the method may also comprise sampling a value indicative of the quality of the wireless communication link over a time period which includes a period of physical activity detected by the sampling of one or more physical characteristics of the link. By comparing values of the quality of the wireless communication link sampled before and after the first time period, a change of quality of the wireless communications link which corresponds to the detected period of physical activity may be found. In response to the comparison finding that the values of the quality of the wireless communication link sampled before and after the first time period differ by more than a threshold amount, an alert may be generated to indicate that physical activity occurs at a similar time to a persistent change in the quality of the wireless communications link.

In some embodiments, detecting a period of physical activity in the vicinity of the first access point comprises detecting a first time of a period of physical activity in the vicinity of the first access point by detecting an increase in volatility in the sampled values of the physical characteristic.

In some embodiments, detecting a period of physical activity in the vicinity of the first access point further comprises detecting a second time of a period of physical activity in the vicinity of the first access point by detecting a decrease in the volatility in the sampled values of the physical characteristic.

In some embodiments, the physical characteristic of a wireless communication link comprises channel state information.

In some embodiments in which the physical characteristic comprises channel state information, the channel state information comprises one or more channel state information matrices having channel state values for each of a plurality of frequency bands and/or antenna pairs, and the method may further comprise i) analyzing the channel state information to classify the size, nature or location of an obstruction to wireless communication between the first access point and the second access point, wherein the generated alert includes information regarding the size, nature or location of the obstruction.

In some embodiments, the monitored quality of the wireless communication link comprises an error rate.

In some embodiments, in response to detecting an onset of a period of physical activity in the vicinity of the first access point, the frequency of sampling the physical characteristic of the wireless communication link is increased. Such embodiments may further comprise decreasing the frequency of sampling the physical characteristic of the wireless communication link in response to detecting the end of a period of physical activity in the vicinity of the first access point.

In some embodiments, the value indicative of the quality of the wireless communication link comprises a quality of communication with a wireless device communicating via the communication link between the first access point and the second access point. In other words, the quality of the wireless link between the first access point and the second access point may be determined by measuring throughput on another link on a path which includes the link being monitored.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
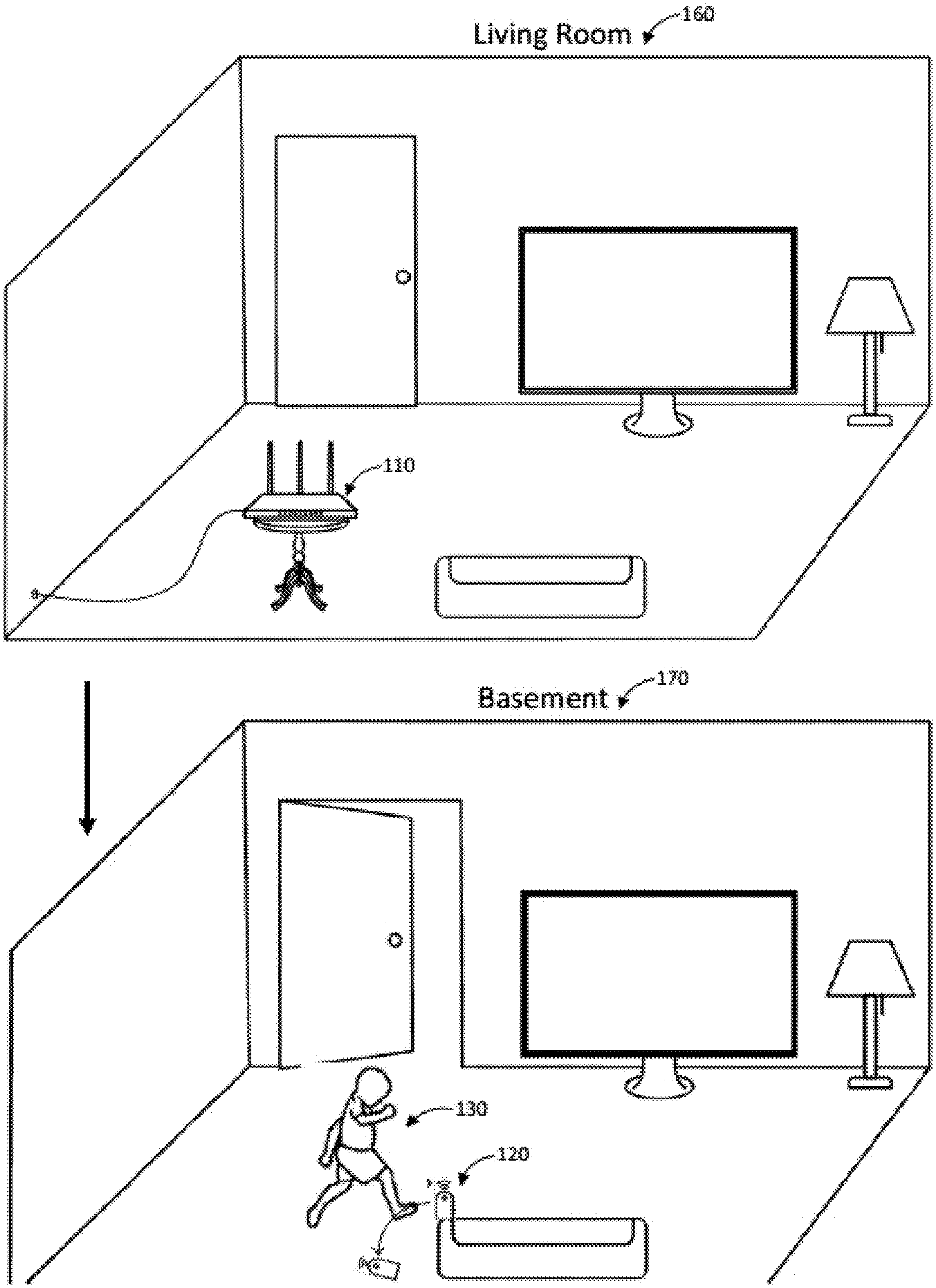
FIG. 1 illustrates an example of a use case for a system in accordance with some examples of the disclosure.

FIG. 1 illustrates an example of a use case of a system for alerting a user to human influence on the quality of service offered by a wireless mesh network.

The example use case involves a residential wireless network. The disclosure is however also relevant in relation to wireless networks in commercial and other premises.

The example residential wireless network comprises at least a residential gateway router 110 (an example of a first wireless access point) installed in a living room 160 and a second wireless access point 120 installed in a basement room 170. The residential gateway 110 and the second access point 120 provide a bidirectional wireless communications link (a backhaul link) which devices or clients associated with the access points can use to access the Internet via the residential gateway 110. For example, wireless devices present in the basement 170 may associate with the second wireless access point 120 to obtain a fronthaul wireless link, and the traffic carried over that fronthaul wireless link may then be carried over the backhaul wireless link to the residential gateway 110 which may in turn route the traffic onto the Internet.

As seen in the example use case seen in FIG. 1, a problem may arise if a human (for example, a child) dislodges a wireless access point from a first position and/or orientation in which the wireless access point provides a relatively high-quality backhaul link to another position or orientation in which the wireless access point offers poorer service (e.g., the access point may be knocked over and fall to the ground behind furniture). Often a user may not be aware of a corresponding drop in the quality of service offered by the wireless network, and will be likely be unaware of the reason for the drop in the quality of service.

In other scenarios, the movement of the wireless access point may be deliberate. Deliberate movement of the wireless access point may worsen or improve the quality of the service offered by the wireless access point.

Figure 2:
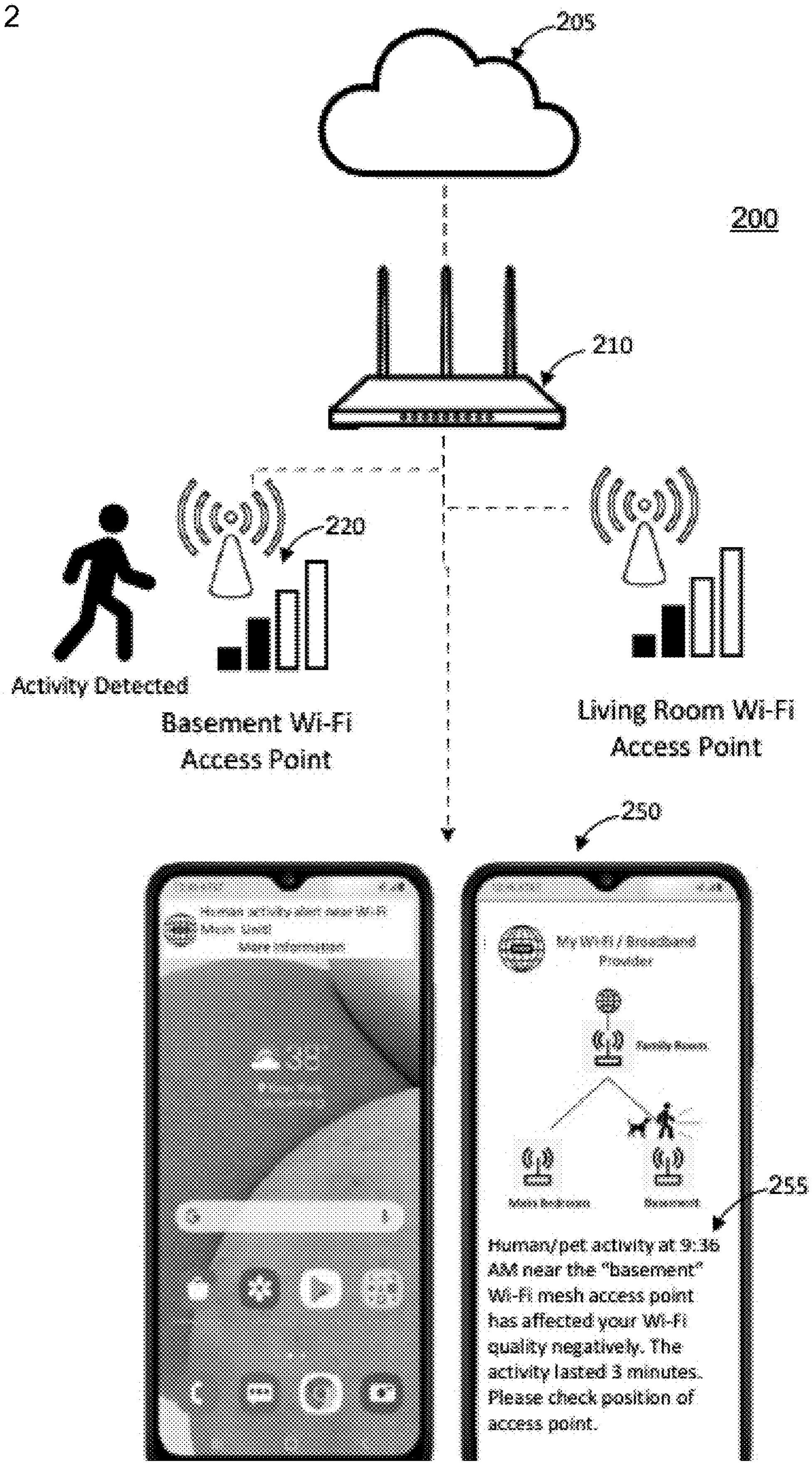
FIG. 2 illustrates a system for alerting a user to a human influence on a wireless communications link in accordance with some examples of the disclosure.

FIG. 2 illustrates a system 200 configured to monitor the performance of a wireless network (in e.g., a residential or commercial setting) comprising residential gateway 210, a second access point 220 and a user device 250. Control circuitry (e.g., integrated within access point 210) may detect an activity which coincides with a change in the performance of the wireless network. The control circuitry may correlate the change in the performance of the wireless network 205 to the detected activity e.g., 130 and issue an alert 255 based on the correlation.

In some examples, the first access point 210 (e.g., a residential access gateway), acts as a primary hub for offering Internet connectivity throughout the network environment. In some examples, Internet connectivity may be provided via a fiber optic line, cable modem, DSL, FWA (Fixed Wireless Access) or other wired connection.

In some examples, the first access point 210 broadcasts a wireless signal e.g., using antennas and radio frequency transceivers, to the network environment, e.g., in a room, such as living room 160, in a residential home. In some examples, an additional access point (e.g., access point 220) is deployed in the network environment to extend the coverage of the wireless network to areas with poor signal strength. In some configurations, multiple access points may form a mesh network where each access point communicates with neighboring access points, creating a unified network infrastructure that extends wireless coverage throughout the network environment. The mesh network may comprise, for example, a primary upstream access point (e.g., a Wi-Fi router) and several secondary downstream access points (e.g., Wi-Fi mesh nodes). Any set of access points within the network may be considered as either a first or second access point depending on their role within the network topology or their relative positioning within the network environment.

Access point 220, depicted in room 170 (e.g., the basement), may serve as a second access point, e.g., a Wi-Fi mesh node. The second access point may receive the wireless signal emitted by the first access point 210 and retransmit it to provide further coverage to the network environment. The communication between the first and second access points may enable a user device to maintain connectivity to the wireless network while moving throughout the network environment.

In some examples, the first and/or second access point is a Wi-Fi router or mesh node configured for providing a wireless network signal. The first and/or second access point may also be a user device equipped with the capability to act as a wireless access point, such as a smartphone, laptop, smart TV or smart device that has the capability to establish and propagate a wireless network signal which allows other devices to connect to the wireless network.

In some examples, control circuitry within or otherwise coupled to the first access point 210, as well as potentially within or otherwise coupled to other access points or network equipment, monitors the quality of a wireless communication link having one or both of the first access point and the second access point as an endpoint or node. The monitoring may include analyzing metrics such as signal strength, data throughput, packet loss, and/or latency. In some examples, control circuitry monitors for changes in channel state information (CSI), which is the known channel properties of a wireless communication link (e.g., between the first and second access points). CSI may be monitored by transmitting a known sequence of data from one access point to another, e.g., channel sounding. CSI may describe how a signal propagates between wireless devices (e.g., access point 210 and access point 220) and may represent the combined effect of, for example, scattering, fading, and power decay with distance.

Figure 3:
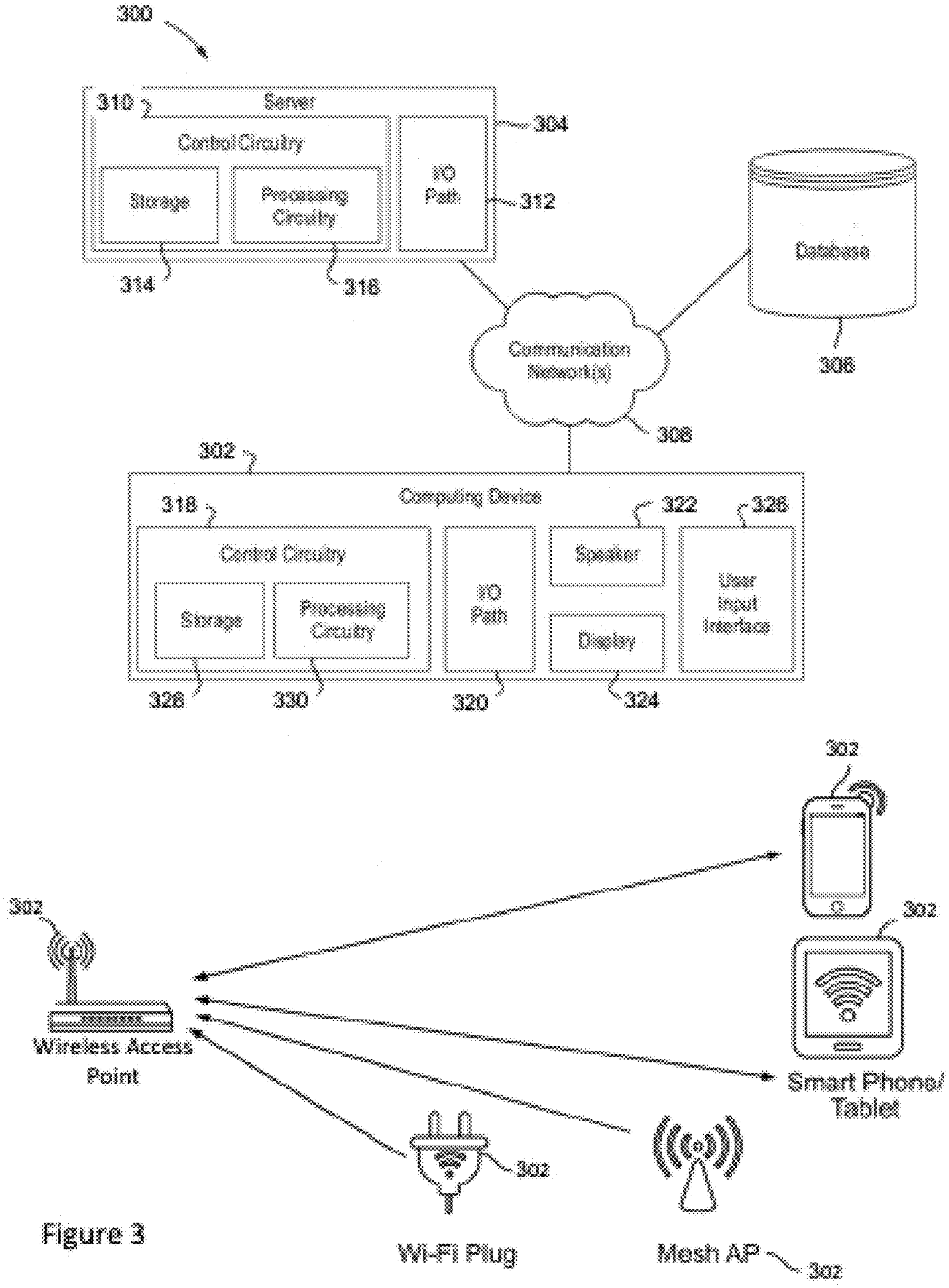
FIG. 3 illustrates components of an example system for monitoring the performance of a wireless network, in accordance with some examples of the disclosure.

FIG. 3 is an illustrative diagram showing example system 300 configured to monitor the performance of a wireless network. Although FIG. 3 shows system 300 as including a number and configuration of individual components, in some examples, any number of the components of system 300 may be combined and/or integrated as one device, e.g., such as a wireless router or access point. System 300 includes computing device 302 (e.g., an access point), server 304 (e.g., a cloud-based server associated with an Internet service provider), and database 306, each of which is communicatively coupled to communication network 308, which may be the Internet, or any other suitable network or intra-network. In some examples, system 300 excludes server 304, and functionality that would otherwise be implemented by server 304 is instead implemented by other components of system 300, such as computing device 302. In still other examples, server 304 works in conjunction with computing device 302 to implement certain functionality described herein in a distributed or cooperative manner.

Server 304 includes control circuitry 310 and input/output (hereinafter "I/O") path 312, and control circuitry 310 includes storage 314 and processing circuitry 316. Computing device 302, which may be a wireless access point, personal computer, a laptop computer, a tablet computer, a smartphone, a smart television, a smart speaker, or any other type of computing device, includes control circuitry 318, I/O path 320, speaker 322, display 324, and user input interface 326, which in some examples provides a user selectable option to adjust parameters for monitoring wireless network performance. Control circuitry 318 includes storage 328 and processing circuitry 330. Control circuitry 310 and/or 318 may be based on any suitable processing circuitry such as processing circuitry 316 and/or 320. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 314, storage 328, and/or storages of other components of system 300 (e.g., storages of database 306, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 314, storage 328, and/or storages of other components of system 300 may be used to store various types of content, metadata, and other data relevant to monitoring wireless network performance. Non-volatile memory may also be used (e.g., to launch a boot-up routine and other instructions). Cloud-based storage may be used to supplement storages 314, 328 or instead of storages 314, 328. In some examples, control circuitry 310 and/or 318 executes instructions for an application stored in memory (e.g., storage 314 and/or 328). Specifically, control circuitry 314 and/or 328 may be instructed by the application to perform the functions discussed herein. In some implementations, any action performed by control circuitry 314 and/or 328 may be based on instructions received from the application. For example, the application may be implemented as software or a set of executable instructions that may be stored in storage 314 and/or 328 and executed by processing circuitry 316 and/or 330. In some examples, the application may be a client/server application where a client application resides on computing device 302, and a server application resides on server 304.

The application may be implemented using any suitable architecture. For example, it may be a stand-alone application wholly implemented on computing device 302. In such an approach, instructions for the application are stored locally (e.g., in storage 328), and data for use by the application may be downloaded on a periodic basis (e.g., from an out-of-band feed, from an Internet resource, or using another suitable approach). Control circuitry 318 may retrieve instructions for the application from storage 328 and process the instructions to perform the functionality described herein. Based on the processed instructions, control circuitry 318 may determine what action to perform when input is received from user input interface 326.

In client/server-based examples, control circuitry 318 may include communication circuitry suitable for communicating with an application server (e.g., server 304) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 308). In another example of a client/server-based application, control circuitry 318 runs a web browser that interprets web pages provided by a remote server (e.g., server 304). For example, the remote server may store the instructions for the application in a storage device. The remote server may process the stored instructions using circuitry (e.g., control circuitry 310) and/or generate displays. Computing device 302 may receive the displays generated by the remote server and may display the content of the displays locally via display 324. This way, the processing of the instructions is performed remotely (e.g., by server 304) while the resulting displays, such as the display windows described elsewhere herein, are provided locally on computing device 302. Computing device 302 may receive inputs from the user via input interface 326 and transmit those inputs to the remote server for processing and generating the corresponding displays.

A user may send instructions, e.g., to adjust parameters for monitoring wireless network performance, to control circuitry 310 and/or 318 using user input interface 326. User input interface 326 may be any suitable user interface, such as a remote control, trackball, keypad, keyboard, touchscreen, touchpad, stylus input, joystick, voice recognition interface, gaming controller, or other user input interfaces. User input interface 326 may be integrated with or combined with display 324, which may be a monitor, a television, a liquid crystal display (LCD), an electronic ink display, or any other equipment suitable for displaying visual images.

Server 304 and computing device 302 may transmit and receive content and data via I/O path 312 and 320, respectively. For instance, I/O path 312 and/or I/O path 320 may include a communication port(s) configured to transmit and/or receive (for instance to and/or from database 306), via communication network 308, content item identifiers, content metadata, natural language queries, and/or other data. Control circuitry 310, 318 may be used to send and receive commands, requests, and other suitable data using I/O paths 312, 320.

Figure 4:
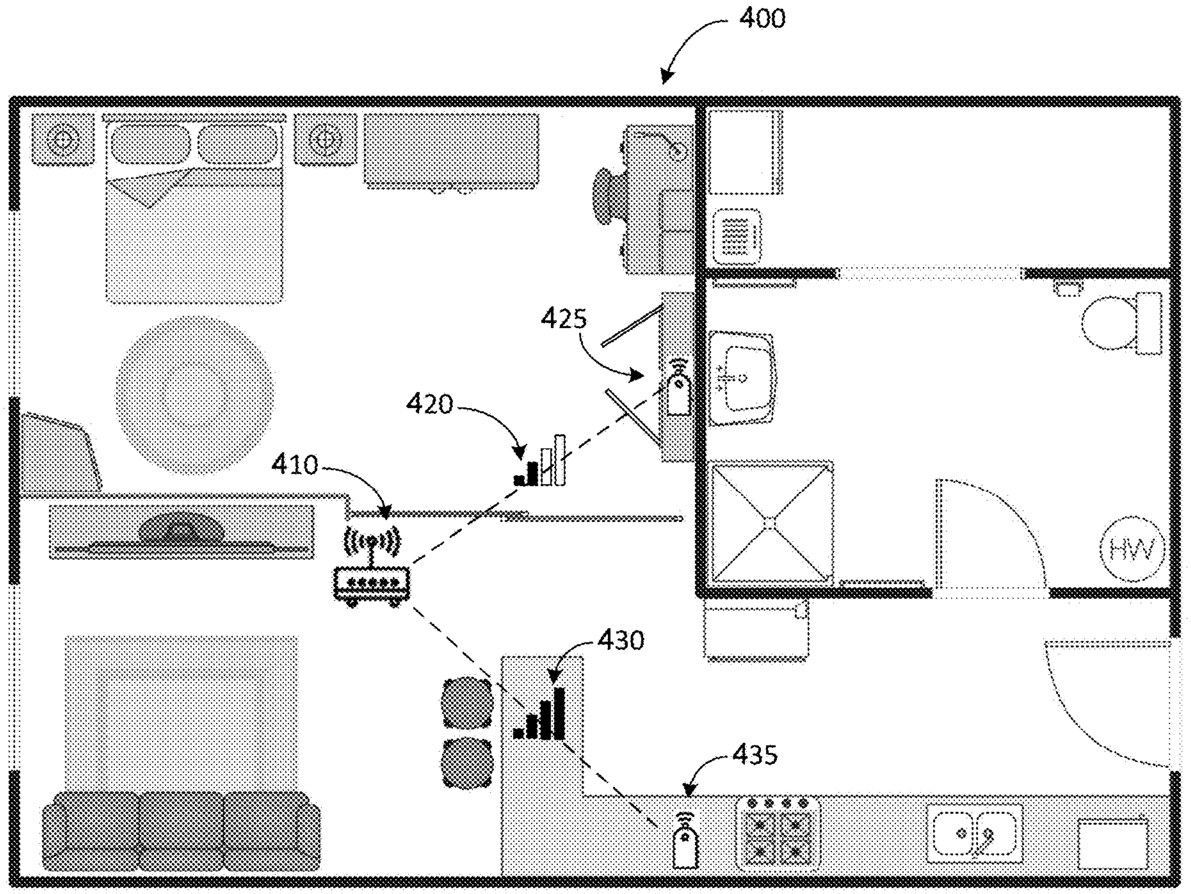
FIG. 4 illustrates a network environment, in accordance with some examples of the disclosure.

FIG. 4 provides an illustrative depiction of network environment 400, which encompasses multiple rooms within a residential home, demonstrating the configuration and performance of a wireless network deployed across the premises. In some examples, the wireless network comprises a first wireless access point 410, serving as the primary hub for network connectivity, and multiple additional access points (425 and 435), which function as Wi-Fi nodes or secondary access points to extend coverage throughout the residence.

In the depicted example, access point 435 is situated in the kitchen, offering a clear and relatively unobstructed signal path to the upstream access point 410. The quality of the wireless communication link between access points 410 and 435 is visually represented by signal bars 430, indicating a strong and stable connection.

Conversely, access point 425 is positioned in an adjacent bedroom and housed inside a cupboard, which may lead to signal interference and degradation. For instance, the signal path between access points 410 and 425 is obstructed by the cupboard doors and a partitioning wall separating the two rooms. As depicted by illustrative signal bars 420, the quality of the wireless communication link between these access points is notably lower, signifying potential connectivity issues and reduced network performance.

In some examples, installation of the wireless network is conducted by trained technicians who possess the expertise to optimize network performance while considering various environmental factors. For example, during initial setup, the technician may ensure the proper installation of Wi-Fi routers or All-in-one Gateways (AWG) Downstream of a cable modem or an AWG., which may integrate cable modems and routers. The technician may evaluate Wi-Fi signal quality and throughput using diagnostic tools. Even if diagnostic tools are not utilized for installation, technicians may strategically place access points to achieve optimal coverage throughout the premises.

In some examples, control circuitry integrated in or otherwise coupled to a network device (e.g., control circuitry 318 of device 302, 410, 425 or 435) may be configured to store a certificate of network configuration during periods of stable throughput, e.g., such as after initial installation and setup. The certificate of network configuration may serve to document and certify the state of the wireless network at a particular moment. For example, it may be compared to a current configuration (e.g., when experiencing network performance issues), against a previously stable state, aiding in the identification of changes affecting network performance.

In some examples, the certificate of network configuration comprises CSI, which may include or be used to derive details such as signal strength, signal-to-noise ratio (SNR), frequency offsets, phase shifts, multipath propagation effects, and/or spatial channel responses. Additionally, CSI may include parameters related to antenna configurations, beamforming weights, and/or modulation schemes.

In some examples, the certificate of network configuration comprises parameters related to the quality of a wireless communication link such as bit error rate (BER), block error rate (BLER), signal strength, signal-to-noise ratio (SNR), and/or overall transmission stability.

In some examples, the configuration or environment of the network may change, potentially impacting the quality of the wireless communication link between network devices (e.g., device 302). These changes could range from the relocation of network devices, e.g., such as access point 410, to adjustments in the layout of furniture within the premises. Such changes or activities may inadvertently obstruct signal paths or introduce sources of interference, leading to degradation in the quality of wireless communication. For instance, a network device relocated to a non-favorable environment, such as near a window exposed to direct sunlight, may experience elevated temperatures beyond recommended limits, affecting its operational efficiency and potentially causing performance issues. Similarly, placing an access point inside a cupboard, as illustrated by access point 425, may impede signal propagation, resulting in reduced connectivity and compromised network performance.

In some examples, network environments, such as in commercial settings like conference rooms or commercial venues, encounter diverse activities that impact network performance. For example, fluctuations in crowd densities during events may lead to unpredictable fluctuations in network performance due to an increase in the number of connected devices accessing the network simultaneously or obstructions caused by the movement of people. Such activities may affect the quality of communication between devices (e.g., between devices 302) making it challenging to maintain consistent and reliable network connectivity.

In some examples, the quality of a wireless communication link in a wireless network refers to the effectiveness of the wireless communication for transmitting data between network devices (e.g., access points or user devices). Quality may be quantified by measures indicative of the ability of a communications link to reproduce a message input at one end of the link at the other end of the link, such as error rates (e.g. Bit Error Rate (BER), Block Error Rate (BLER), frame error rate, packet error rate, coding and modulation (e.g. the Modulation and Coding Scheme index found in some 802.11 wireless networks), throughput or goodput. In technical terms, a high quality implies minimal interference, low packet loss, and optimal throughput, facilitating robust and consistent data exchange within the network. Conversely, poor channel quality indicates higher levels of interference or attenuation, which can degrade communication performance, leading to increased latency, reduced throughput, and potential data loss.

In some examples, a change in Channel State Information (CSI) is indicative of physical activity within a proximity of an access point (e.g., 425 or 435), such as the movement of potential wireless signal obstructions near an access point. If a monitored change in CSI coincides with a monitored change in the quality of a wireless communication link (e.g., between access point 410 and 425), control circuitry (e.g., of access point 410) may infer that the activity which impacted the CSI, has subsequently influenced the quality of the wireless communication link. In some examples, control circuitry may determine the potential cause behind changes in network performance based on a determined correlation between changes in CSI and changes in quality of a wireless communication link.

In some examples, control circuitry (e.g., of access point 410) characterizes a change in CSI as a CSI change event, distinguishing between distinct changes in CSI that are separated by a period of time or exhibit different characteristics, and may be monitored by collecting time series CSI data. The determination of a correlation between the monitored quality of the wireless communication link and the change event in channel state information is detailed further in subsequent FIG.s.

In some examples, wireless signal characteristics such as CSI may be used to generate a map of the network environment (e.g., 400 of FIG. 4). CSI may be collected using a process called 'channel sounding', in which one access point sends out a known sequence of bits to another access point. The known sequence of bits, when transmitted and received (e.g., by the first and second access points), is affected (e.g., reflected, refracted, diffracted, etc.) by obstructions in the network environment.

In some examples, the resulting information is stored (e.g., in storage 328 of FIG. 3) in a CSI matrix 506. The matrix may, for example, represent the state of each channel in a multichannel communications link. Each channel may use a different frequency band, and a different pair of transmit and receive antennas. In some examples, other wireless signal characteristics may also be derived such as received signal strength indicator (RSSI), received channel power indicator (RCPI), frequency and timing shifts, doppler shifts and changes in fading patterns.

For example, consider a scenario where the first access point (e.g., 410) sends a sequence of bits towards the second access point (e.g., 425). As these bits propagate through the network environment, they encounter obstacles like walls, furniture, and appliances, which affect their trajectory. The second access point receives the transmitted bits, capturing the alterations induced by obstacles in the network environment. In some examples, the resulting CSI data, provides insights into the spatial and temporal characteristics of the wireless channel (e.g., between access points). In some examples, a map of the network environment is generated, depicting the propagation of wireless signals and identifying areas prone to signal degradation or interference. The map may be useful in visualizing the impact of obstructions on signal propagation.

Figure 5:
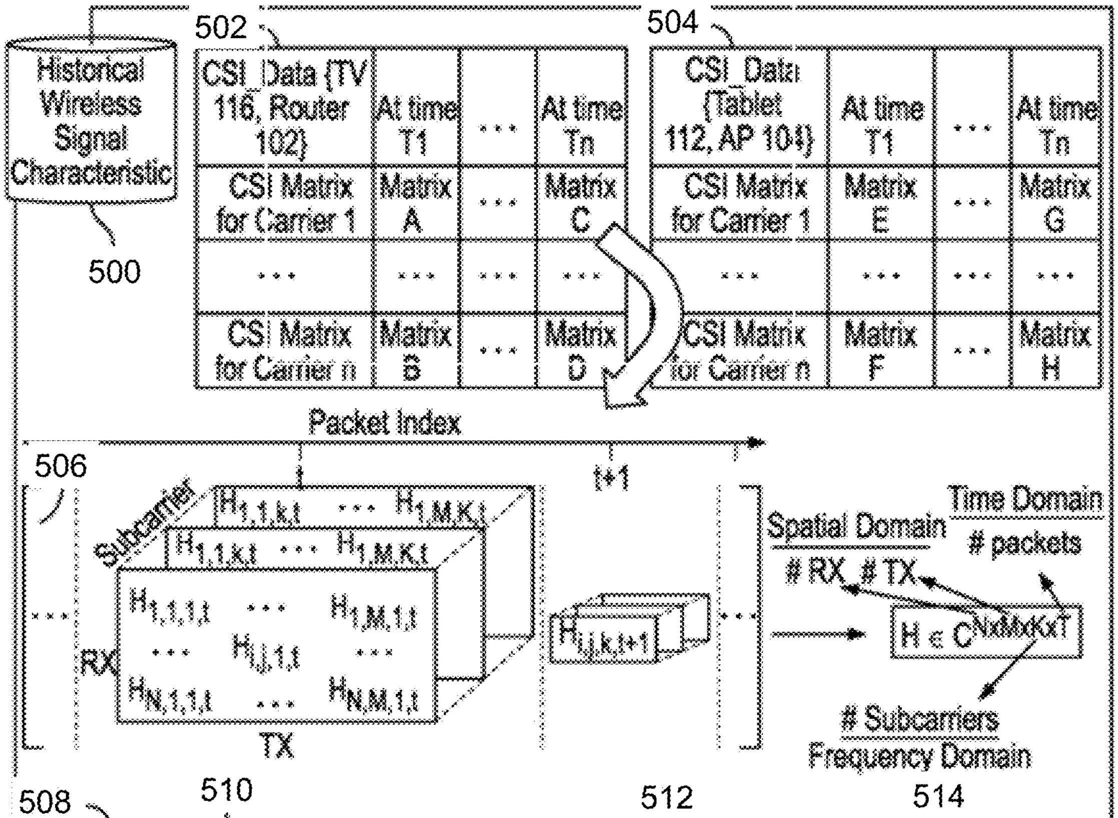
FIG. 5 shows illustrative data structures of wireless signal characteristics, in accordance with some examples of the disclosure.

FIG. 5 shows illustrative data structures of wireless signal characteristics (e.g., CSI), in accordance with some examples of this disclosure. In some examples, control circuitry determines wireless signal characteristics based on one or more of CSI, RSSI and RCPI.

In some examples, the first access point (e.g., 110 or 410), incorporates multiple input multiple output (MIMO) technologies like MIMO-OFDM or multi-user MIMO. MIMO-OFDM enables simultaneous communication with multiple devices, while multi-user MIMO facilitates communication with multiple devices concurrently. Additionally, single-user MIMO provides CSI for each set of transmit and receive antennas across specific carrier frequencies, such as those between the antennas of the access point (e.g., 310 or 410) and a user device (e.g., 302).

In some examples, wireless signals travel from a transmitting device to a receiving device across various paths at various carrier frequencies. A series of CSI measurements may be collected over time, capturing the propagation of wireless signals through the surrounding network environment (e.g., objects or humans) across time, frequency, and spatial domains. The CSI measurements may be used to create a map (e.g., 400), illustrating wireless signal propagation characteristics within the network environment.

In some examples, control circuitry (e.g., of access point 310) utilizes the map (e.g., 300) to assess attributes of the network environment, such as how wireless signals are absorbed or reflected by various objects. The resulting CSI may be used to determine the nature of nearby activities, discerning factors such as the presence or absence of individuals or objects, as well as their motion or lack thereof.

Consider a scenario in which a wireless network is installed in a residential network environment, featuring an access point (e.g., access point 410) and a secondary access point (e.g., access point 425) positioned in separate rooms. Initially, the network operates smoothly, ensuring consistent connectivity between the access points. However, if access point 425 is relocated to a new position within the same room, the propagation path of wireless signals may be altered due to changes in the physical environment. Consequently, CSI measurements between access points 410 and 425 may exhibit fluctuations as well as a potential change in the quality of the wireless communication link.

In some examples, the following method may be implemented for calculating a measure of the time-rate-of-change in a wireless communication link. For example, a portion of the CSI matrix that affects the specific subcarriers (shown in FIG. 5) used during transmission and reception for activity detection is determined. A standard deviation for each element of the matrix, for the affected subcarriers, across the time series may then be calculated. Each standard deviation value is computed based on the time series data of the same element within the CSI matrix. The formula for the standard deviation may be given by:

$$\sigma_{ijkl} = \sqrt{\frac{(x_{ijkl,t1}-\mu)^2 + (x_{ijkl,t2}-\mu)^2 + (x_{ijkl,t3}-\mu)^2 + \dots + (x_{ijkl,tN3}-\mu)^2}{N}}$$

Here, $\sigma_{ijkl}$ represents the standard deviation of an element in a 4D matrix calculated across time series data $x_{ijkl,\ t1}$, $x_{ijkl,\ t2}$, . . . , $x_{ijkl,\ tN}$. Each $x_{ijkl,\ tN}$ is an element at position ijkl in the matrix at time t=N, while μ is the mean of the matrix element $x_{ijkl}$ across the time series ranging from t1 to tN during which the activity is detected. The mean value of all the standard deviation values in the matrix region of interest (affected by Tx/Rx) may be calculated. In an embodiment, a higher mean value indicates a higher time rate of change.

In some examples, upon detecting a change in CSI and or the quality of the wireless communication link, control circuitry, such as that of access point 310, analyzes wireless signal characteristics (e.g., CSI, RSSI, or RCPI) to determine an activity responsible for the monitored change. In some examples, the control circuitry identifies the monitored change in CSI (e.g., relocation of access point 325) as a CSI change event. In some examples, a generated map depicts the obstruction, such as the doors of a cupboard, along with the presence of a person involved in the CSI change event which corresponds to the change in quality of the wireless communication link.

As shown in FIG. 5, data pertaining to wireless signal characteristics 500 may be stored in association with a certificate of network configuration (e.g., database 306 or storage 314 or 328). The CSI may correspond to a three-dimensional matrix of values 506 corresponding to a number of transmitting antennas (Tx), a number of receiving antennas (Rx) and a number of subcarriers, and may be indicative of amplitude and phase variation of a channel within a frequency used in the wireless transmissions.

In some examples, a data structure stores CSI associated with, or otherwise used to generate a map (e.g., in tuple format). For example, table 502 may store matrices of CSI associated with a communication link between an access point and a user device (e.g., TV and Router) at various points in time, and table 504 may store matrices of CSI associated with an access point and another user device (e.g., Tablet and wireless repeater) at various points in time. The matrices may correspond to the format illustrated at 506. In the example of CSI matrix 506, H may represent the CSI matrix, Rx-Tx may represent a receiving and transmitting antenna pair, M and N may respectively represent a number of transmit and receive antennas in a MIMO-OFDM channel, K may represent a number of subcarriers in the frequency domain, and T may represent a number of timeslots in the time domain.

In some examples, tables similar to tables 502 and 504 may be generated for each user device capable of participating in RF sensing, and each access point (e.g., 502). Such tables along with tables 502 and 504 may be used to generate table 508. Table 508 may store information for a plurality of areas (e.g., rooms) of the network environment, such as depicted in map 400, and determined based on the CSI. Areas may be identified or characterized by, as an example, names of devices in the area (e.g., "living room TV") as shown in column 510. Another column 512 may indicate the type of wireless device (e.g., desktop computer) in the area or other identified objects (e.g., table) by using wireless signal characteristics (e.g., CSI). The respective locations of each object/device may be indicated by relative coordinates as shown in column 514.

Figure 6:
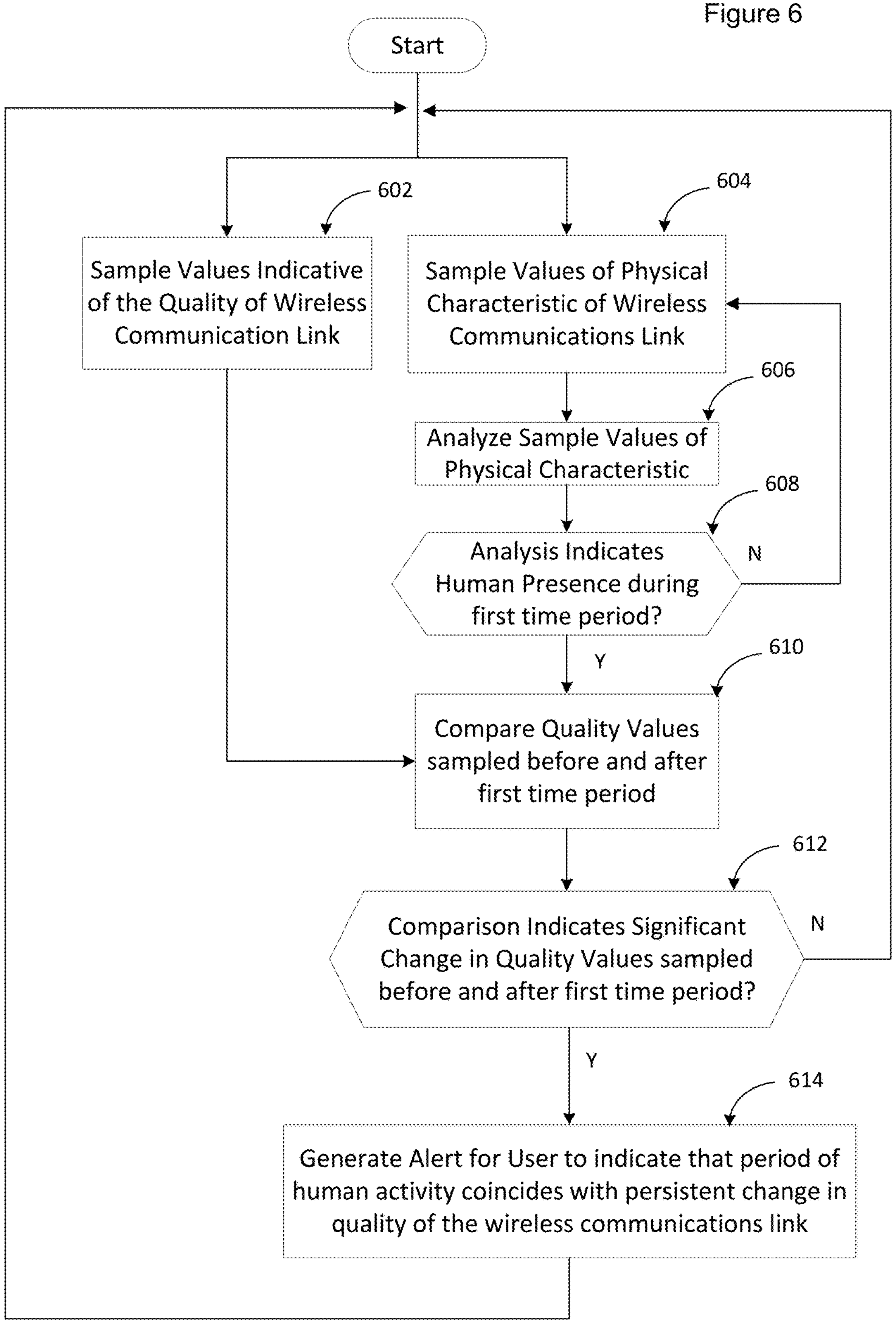
FIG. 6 is a flowchart illustrating a process of alerting a user to human influence on a wireless communications link in accordance with some examples of the disclosure.

An example process executed by control circuitry to provide a method of alerting a user to human influence on a wireless communication link is illustrated in FIG. 6. Once the process has started, the control circuitry samples 602 values indicative of the quality of a wireless communications link (e.g., the link between the residential gateway 110 and the second wireless access point 220 seen in FIG. 2). The sampled values may, for example, be samples of throughput or goodput across the link, samples of an index representing the modulation and coding scheme used on the link (if dynamic link adaptation is used), or an error rate seen on the link (e.g. a Bit Error Rate or Block Error Rate).

In parallel with the sampling of the values indicative of quality, the control circuitry samples 604 values of a physical characteristic of the wireless communications link. The physical characteristic may be the channel state information mentioned above, received signal strength, received signal power, signal to noise ratio or any other measure of a physical characteristic of the network link that informs activity in the multipath fading environment between 2 devices that are endpoints of the wireless communication link.

The control circuitry repeatedly or continuously analyzes the sampled values of the physical characteristic. The control circuitry may then determine 608 whether the analysis is indicative of human presence in the vicinity of one or both of the wireless access points at either end of the link.

If the determination 608 finds that the sampled values of the one or more physical characteristics of the channel are not indicative of physical activity around either end of the link, then the sampling 604 continues. If, on the other hand, the analysis finds that the sampled values of the one or more physical characteristics of the channel are indicative of physical activity around either end of the link, then the control circuitry compares quality values sampled over a period before the start of the detected physical activity, and a period after the end of the detected physical activity. In some examples, the control circuitry waits for a sufficient time to gather a representative sample of values indicative of the quality of the link after the end of the detected physical activity.

The control circuitry then performs a determination 612 of whether the comparison 610 indicates that there was a significant change between the quality values sampled before the detected period of physical activity, and the quality values sampled after the detected period of physical activity.

If the determination 612 finds that there was not a significant change in quality of service over the wireless communications link during the detected physical activity, then the process returns to sampling of the quality values 602 and sampling of the one or more physical characteristics of the link.

If, on the other hand, the determination 612 finds that there was a significant change in quality of service over the wireless communications link during the detected physical activity, then the control circuity generates 614 an alert for the user to indicate the coincidence of the detected physical activity at one or both ends of the link and the detected change in quality of service over the link.

It will be seen how the example would, in the use case illustrated in FIG. 1, alert 614 a user (e.g. an adult user) to the possibility that physical activity has dislodged the second access point 120 causing a resultant drop in the quality of service offered by the wireless network. It will be seen how this could beneficially avoid the need for a telecoms engineer to visit the residential premises in order to ascertain the cause of the drop in quality of service.

Once the alert has been generated, the control circuitry returns to sampling the quality of the wireless link, and the physical characteristics of the wireless link. In the use case seen in FIG. 1, the same process as described may generate an alert indicating an improvement in quality of service when the wireless access point is returned to its original position and/or orientation.

Figure 7:
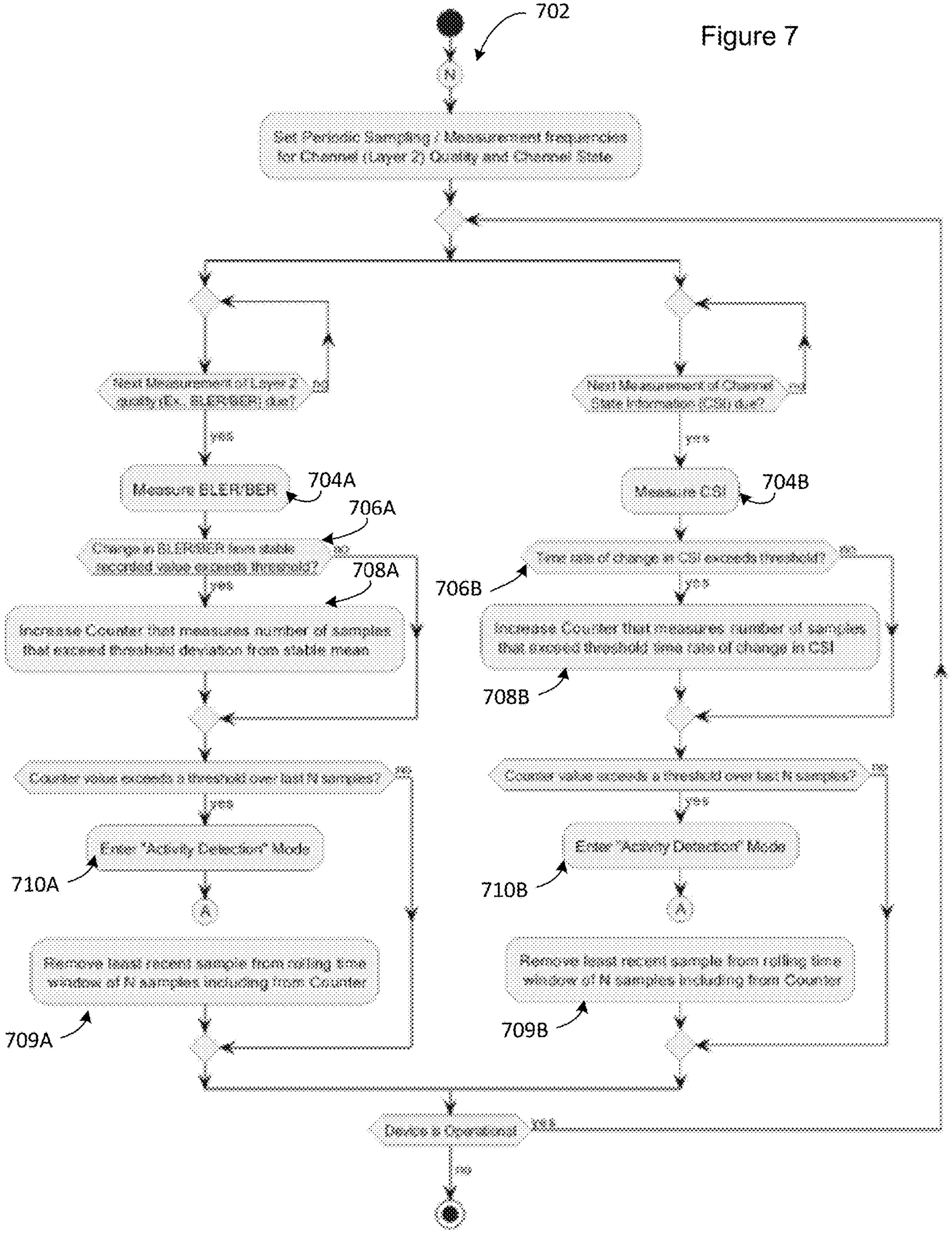
FIG. 7 is a flowchart representing an illustrative process for detecting physical activity in the vicinity of an access point in accordance with some examples of the disclosure.

FIG. 7 shows a flowchart representing an illustrative process for monitoring the performance of a wireless network in accordance with some examples of the disclosure. In this example, the depicted process for monitoring the performance of a wireless network is mirrored for both CSI and the quality of wireless communication link. The process depicted in FIG. 7 begins by setting a first sampling frequency 702 for monitoring CSI and the quality of the wireless communication link (e.g., by sampling BLER). In some examples, both the BLER/BER and CSI are then sampled simultaneously 704A, 704B, respectively, at the first sampling frequency. As previously described, while BLER/BER may serve as a metric for the quality of a wireless communication link, alternative measures may be employed.

In some examples, control circuitry (e.g., of access point 110, 210, 302) assesses whether the sampled BLER/BER deviates 706A from a determined steady state value (e.g., as captured in a certificate of network configuration).

In some examples, volatility in the sampled CSI values is detected. This may be achieved by comparing 706B each change in CSI from sample to sample with a predetermined threshold. A count of the number of such events in the last N samples may be kept. If the change exceeds the threshold, then the count is incremented 708B. If the earliest of the last N samples was an example of a value which represented a change in value greater than the threshold, then the counter is decremented 709B. If the value of the count exceeds a threshold, then activity detection mode (which will be described in relation to FIG. 8 below) is entered.

In some examples, to determine the significance of a deviation, a predetermined threshold is established, which may be expressed as a multiple of standard deviations from the mean (e.g., 3-6 sigma). The threshold may be used to determine if detected deviations attain a requisite level of significance. For example, by setting a threshold of three standard deviations from the mean, the analysis focuses on deviations falling outside of 99.7% of the sampled data.

In some examples, upon exceeding the predefined threshold, a counter is incremented 708A. The counter may be used to test the persistence of these deviations over time. For example, control circuitry may monitor the frequency of significant deviations over a defined sampling interval (e.g., over a period of 1 minute), represented by a predetermined number of samples (N). In some examples a predetermined number of samples (N), represent a CSI change event or a persistent change in the quality of wireless communication link. If the earliest sample was an example of a value which represented a change in value greater than the threshold, then the counter is decremented 709A.

If the count of significant deviations exceeds the predetermined threshold over the last N samples, control circuitry (e.g., of access point 110) enters an activity detection mode (which will be described below in relation to FIG. 8).

For example, a change of the CSI matrix as shown in FIG. 5 may indicate a detected physical activity nearby, (e.g., human or pet movement or other activity). When the change surpasses a set threshold (e.g., a large wireless signal deflection), another counter is incremented to ascertain the persistence of the activity (i.e., how long the activity lasts).

Figure 8:
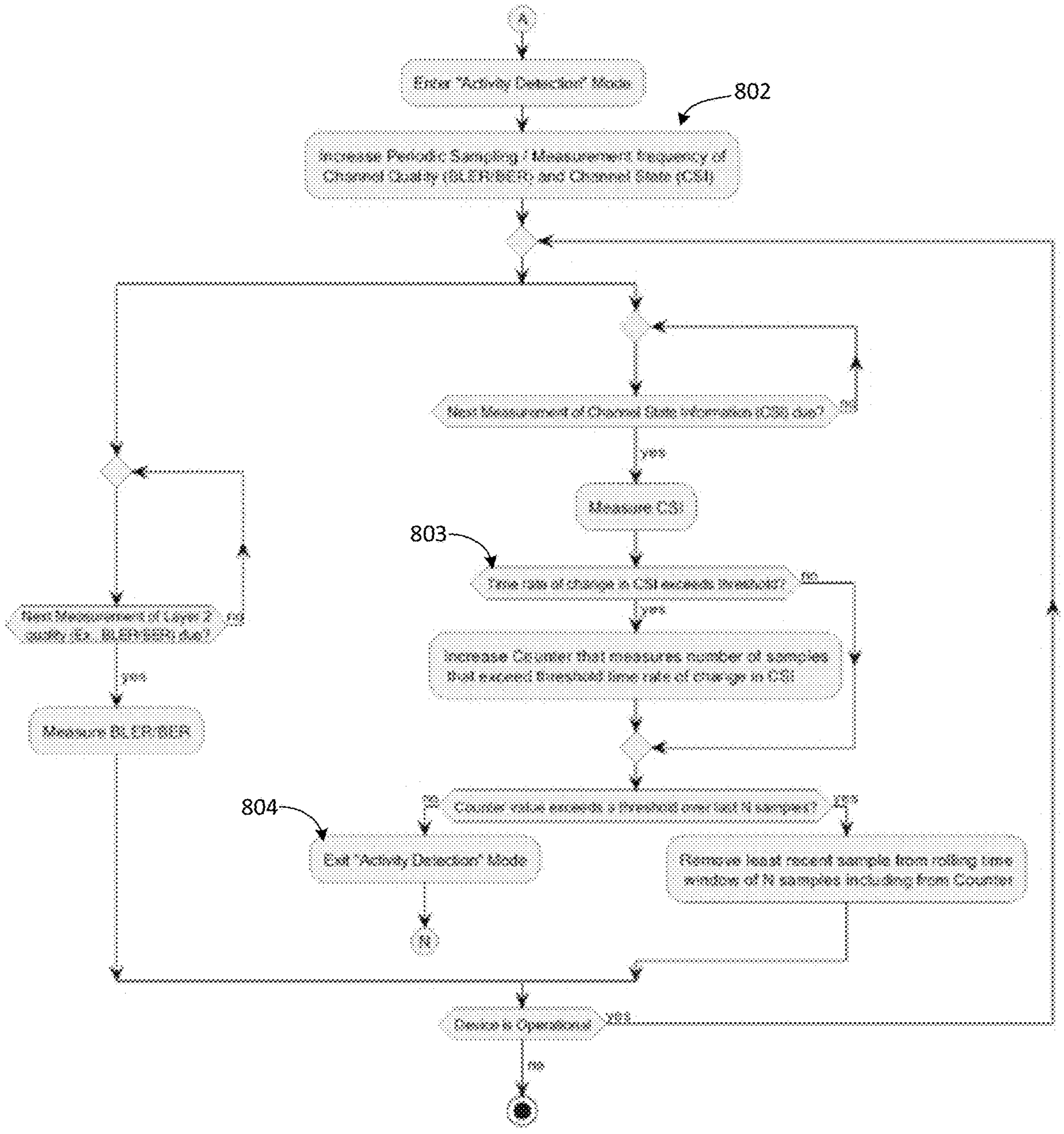
FIG. 8 is a flowchart representing an illustrative activity detection mode in accordance with some examples of the disclosure.

Turning to FIG. 8, an activity detection mode may begin which increasing 802 the periodic sampling frequency. FIG. 8 shows a flowchart representing an example of activity detection mode in accordance with some embodiments of the disclosure. FIG. 8 comprises the steps of: entering "Activity Detection" Mode (800); increasing periodic sampling/measurement frequency of channel quality (BLER/BER) and channel state (CSI) (802); determining if the next measurement of channel state information (CSI) is due (804); measuring CSI (806); checking if the time rate of change in CSI exceeds the threshold (803); increasing the counter that measures the number of samples that exceed the threshold time rate of change in CSI (810); determining if the counter value exceeds a threshold over the last N samples (812); removing the least recent sample from the rolling time window of N samples, including from the counter (814); checking if the next measurement of Layer 2 quality (e.g., BLER/BER) is due (816); measuring BLER/BER (818); exiting "Activity Detection" Mode (804); and confirming if the device is operational (822).

In some examples, initiating the second sampling frequency is based on a time rate of change of the CSI matrix. The time rate of change of the CSI matrix may serve as a proxy for the speed at which the wireless channel changes due to detected physical activity. When the time rate of change exceeds a predefined threshold (e.g., due to increased activity), control circuitry may increase the sampling frequency to a higher sampling frequency (e.g., the second sampling frequency). In this way, control circuitry (e.g., of the first access point) may more quickly determine that an activity potentially causing the CSI change event has ended (e.g., distinguish between a movement of an access point which has been knocked over to a stationary or stable state after it has been knocked over).

In some examples, the time rate of change of CSI is used to distinguish between various types of activities that influence the wireless network environment. For example, differentiating between transient events, such as the relocation of an access point to a different location, which may cause a change in CSI for a limited period. Conversely, it also aids in identifying persistent activities, such as continuous movement of people or pets within the proximity of the access point, leading to sustained alterations in signal characteristics over an extended duration. In some examples, control circuitry (e.g., of an access point) characterizes the nature of the activity that correlates to a change in the monitored quality of the wireless communication link (e.g., as transient or persistent).

In some examples, the enhanced monitoring strategy (e.g., second sampling frequency) enables the control circuitry to detect and respond promptly to changes in network performance e.g., by reducing the amount of time between samples.

In some examples the control circuitry again maintains a rolling time window of the counter over the last N samples. By discarding the least recent sample with each new measurement, the control circuitry maintains a continuous assessment of network performance, adapting to changing circumstances. If the counter falls below a threshold, then activity detection mode may be terminated 804 and normal sampling operation (FIG. 7) resumed.

For example, consider a scenario where an access point (e.g., 425) is relocated to a position surrounded by obstructive elements, resulting in a deterioration of the quality of the wireless communication link (e.g., between access points 410 and 425). In such cases, the control circuitry may use a rolling time window to determine whether a new steady state has been attained (e.g., when the rate of change of CSI has reduced below a threshold value). Despite the cessation of the activity responsible for the change in CSI, the control circuitry may determine that a CSI of the second location may persistently differ from that of the initial location. In some examples, control circuitry may determine whether the alterations in CSI are transient or indicative of a lasting change in network conditions.

FIG. 8 shows steps for monitoring CSI similar to those seen in FIG. 7. For example, after initiating the second sampling frequency 802 for monitoring CSI, control circuitry then collects multiple samples during a time period which corresponds to a single sample period in FIG. 7. In some examples, subsequent to each sample, control circuitry assesses 803 whether the change in sampled CSI deviates from a determined threshold value. Similarly to FIG. 7, a predetermined threshold may be used to evaluate the significance of any deviation in CSI. A counter is initiated to determine if the rate of change of CSI exceeds a threshold (i.e., if the rate of change of CSI persists). If not, control circuitry may return back to the first sampling frequency.

In some examples, when the activity detection mode is activated (e.g., the second sampling frequency), control circuitry may opt for a primary metric to decide when to revert to normal operation (e.g., the first sampling frequency). For example, in the illustrated instance of FIG. 8, the rate of change of CSI serves as the determinant for transitioning back to the first sampling frequency. Although the quality of the wireless communication link may be monitored at either the same or a different sampling frequency as the CSI, in the given example, CSI acts as the trigger for exiting the activity detection mode.

Figure 9:
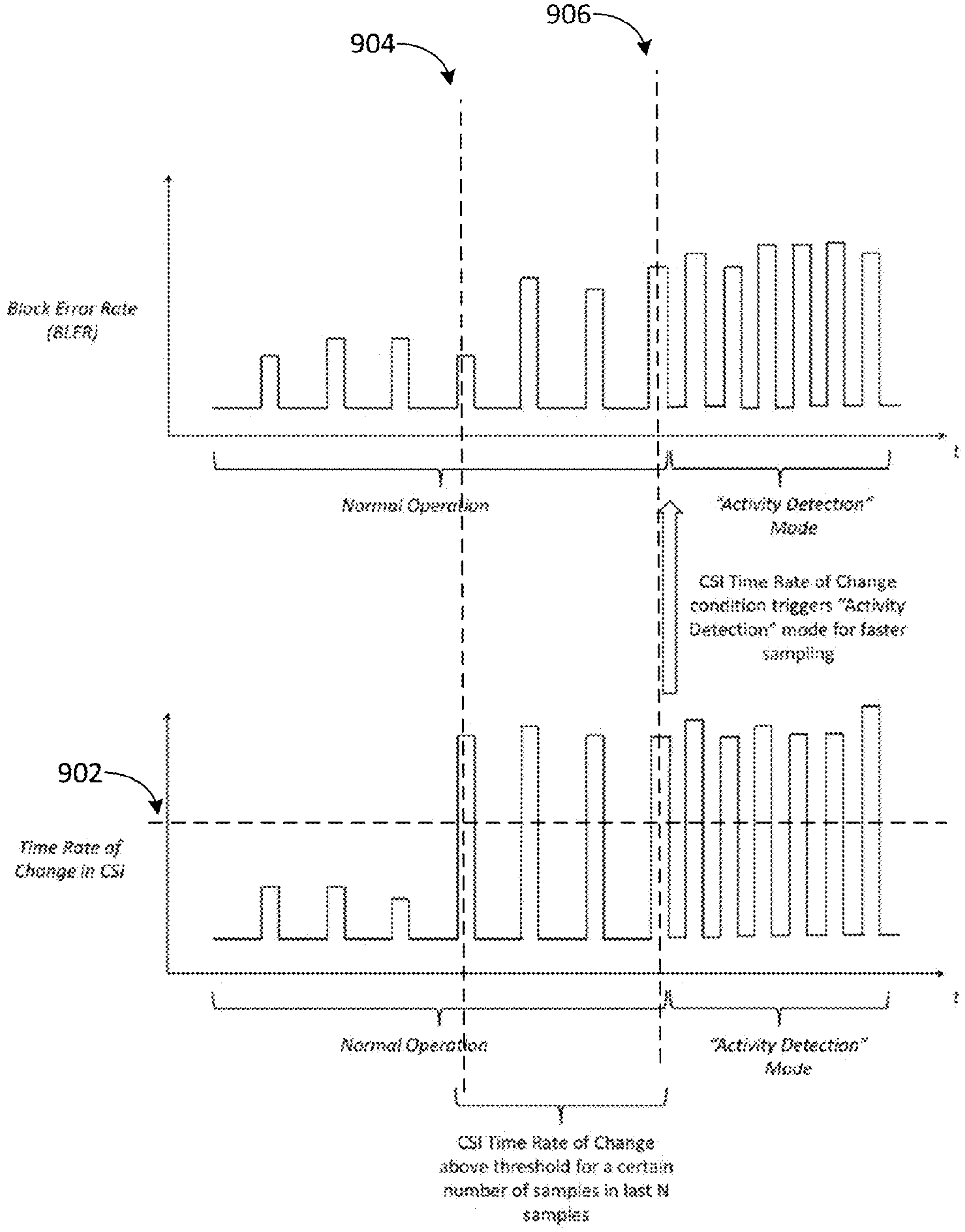
FIG. 9 illustrates a process for monitoring the performance of a wireless network, in accordance with some examples of the disclosure.

FIG. 9 depicts two graphs aligned in time, with the x-axis denoting time (t). In the upper graph, the y-axis represents the block error rate (an example of a channel quality measure), and in the lower graph, the y-axis represents the time rate of change in CSI (an example of a physical characteristic of a channel). The two graphs illustrate various scenarios from examples of the disclosure.

Initially, the graphs portray a normal operating mode, which corresponds to a first sampling frequency. During this phase, the magnitude of the time rate of change in CSI (lower graph) remains low, indicating a period of minimal network disturbance. In some examples, a low time rate of change in CSI occurs when there are no obstructions or movements in the vicinity of the access point (e.g., device 302). The bars on the graph, representing the change in CSI, fall below a predefined threshold 902. This threshold serves as a trigger for the control circuitry (e.g., control circuitry 318 or 310 of devices 302) to respond to any prolonged rise in the time rate of change in CSI by transitioning to a second sampling frequency (as seen in FIG. 8).

At point 904 on the graph, the control circuitry detects that the threshold for the time rate of change in CSI has been exceeded (a first threshold). In accordance with the previously discussed process, in some instances, a counter is initiated by the control circuitry to track the duration for which the change in CSI/time rate of change of CSI remains above the threshold. In some examples, the counter helps determine the persistence of the detected change in CSI, which is indicative of increased activity within the network environment. Upon reaching a predefined threshold value (a second threshold) at a time 906, the control circuitry triggers the transition to the second sampling frequency.

In some examples, during normal operations, sampling occurs at intervals (e.g., every 10-30 seconds) to avoid impacting throughput. However, when significant changes in BER/BLER or CSI time rate are detected, the system switches to a high-frequency sampling mode for physical activity detection. In this mode, sampling may occur continuously, potentially several times per second (e.g., once every 200-500 milliseconds), to accurately capture and respond to the detected changes.

In some examples, the first threshold is associated with a magnitude of time rate of change in CSI/change in CSI, serving as an indication of the extent to which the CSI has changed, and the second threshold is associated with a count (over a specified duration) of changes in CSI that remain above the first threshold.

In some examples, alternative methods are be employed instead of a counter to track the duration for which the time rate of change in CSI remains above the first threshold. For instance, a timer mechanism may be initiated by the control circuitry upon detecting that the first threshold for the time rate of change in CSI has been surpassed, with the timer running until the second threshold value is reached, signaling the transition to the second sampling frequency.

Additionally, statistical analysis techniques like moving averages or trend analysis may be utilized, allowing the control circuitry to continuously monitor change in CSI values over time and assess if observed changes persistently exceed the first threshold level. Moreover, machine learning algorithms may analyze the change in CSI data, identifying patterns indicative of significant changes in network behavior based on historical data.

In some examples, alternative parameters besides change in CSI or BLER may be employed to trigger a switch from a first sampling frequency to a second sampling frequency. For example, parameters such as received signal strength indicator (RSSI), received channel power indicator (RCPI), or packet loss rate (PLR) may be monitored by the control circuitry to detect changes in the network environment. Depending on the specific requirements of the wireless network and the nature of potential disturbances, one or more parameters may be used in combination to initiate the transition. Additionally, the thresholds used for triggering the switch may vary, with the first threshold potentially differing from the second threshold. Moreover, different parameters may have distinct threshold values, reflecting their respective significance in assessing network performance and activity levels.

Continuing with the example depicted in FIG. 9, simultaneously, in the upper graph, where the y-axis represents the Block Error Rate (BLER), a similar transition to the second sampling frequency occurs for BLER (an example of a measurement of the quality of the wireless communication link). As with the previous step, the control circuitry initiates a secondary counter to monitor whether the Block Error Rate remains above the threshold for a specified number of samples. If the Block Error Rate drops below the threshold for a certain number of samples, the control circuitry switches back to the first sampling rate. Additionally, at this juncture, the monitoring of BLER is reverted to the first sampling frequency to maintain synchronization with the change in CSI sampling rate.

In some examples, the control circuitry employs a rolling window to facilitate the transition between different sampling frequencies. This approach involves continuously monitoring the duration for which certain parameters, such as change in CSI or BLER, exceed predefined thresholds. By maintaining a rolling window of counters, the control circuitry may evaluate the persistence of changes in network conditions and activity levels. Depending on the observed patterns and thresholds, the control circuitry switches between different sampling frequencies to adapt to varying network dynamics. In some examples, there may be any number of sampling frequencies, each corresponding to different levels of network activity or performance requirements. In some examples, the transition between sampling frequencies is continuous, where an increase in change in CSI or other relevant parameters directly influences the sampling frequency.

In an example scenario, a person comes into close proximity to an access point, such as standing right in front of it, the magnitude of change in CSI may exceed the first threshold. However, if the person moves away from the access point or their movement causes fluctuations in the change in CSI such that it repeatedly causes the change in CSI to fall below the first threshold, the second threshold may not be reached. As a result, although the first threshold is occasionally surpassed due to these fluctuations, the count of change in CSI fails to consistently reach the specified threshold required to trigger the initiation of the second sampling frequency, or a comparison of the average quality values before and after the change in CSI. Therefore, despite the change in CSI surpassing the first threshold, the absence of sustained change in CSI levels above the threshold prevents the initiation of the second sampling frequency. In some examples, the triggering mechanism for transitioning between sampling frequencies may not be limited to a specific number or type of thresholds. Instead, various thresholds tailored to specific network conditions or performance metrics may be employed as triggers.

In some examples, the control circuitry employes various methods for determining a correlation between a detected CSI change event and a change in the quality of a wireless communication link. For example, control circuitry may analyze the timing of both events. If the CSI change event occurs simultaneously or within a short timeframe of a detected change in the quality of the wireless communication link, there may be a correlation. A synchronization in timing may suggest a potential causal relationship between the two phenomena.

In some examples, the correlation between BER/BLER and CSI time rate of change may be determined using a correlation coefficient such as Pearson's correlation coefficient where r measures the linear relationship between two variables. The equation is:

$$r = \frac{\sum (x_i - \bar{x})(y_i - \bar{y})}{\sqrt{\sum (x_i - \bar{x})^2 \sum (y_i - \bar{y})^2}}$$

Where r is the correlation coefficient, xi are the values of the x-variable in a sample, $\bar{x}$ is the mean of the x-variable, yi are the values of the y-variable in a sample, and $\bar{y}$ is the mean of the y-variable. In the context of the present disclosure, the x-variable (xi) may represent the values of the Bit Error Rate (BER) or Block Error Rate (BLER), which are measures of the quality of the wireless communication link. The y-variable (yi) may represent the time rate of change in Channel State Information (CSI), which is used to detect physical changes in the environment affecting the wireless signal, such as physical activity.

In some examples, during a period when physical activity is detected, the BER/BLER and the CSI time rate of change are sampled at high frequency. The correlation coefficient r between the BER/BLER and the time rate of change in CSI may then be calculated by taking multiple samples of these two variables over the period of detected activity.

In some examples, the system, using the correlation coefficient determines how closely the BER/BLER tracks with the changes in CSI. A high positive correlation may mean that as the BER/BLER increases (indicating poorer quality), the time rate of change in CSI also increases (indicating more significant changes in the environment, such as human movement). Conversely, if a low correlation is detected, it may suggest that the changes in BER/BLER and CSI are independent and not related to the same event or activity.

In some examples, if a high correlation is detected during the period of physical activity, the system may determine that the changes in the wireless communication quality (BER/BLER) are directly related to the detected changes in the environment (CSI).

In some examples, control circuitry may determine the magnitude or severity of the change in CSI compared to the change in the quality of the wireless communication link. If both changes occur with similar levels of intensity or impact, control circuitry may determine a correlation. For example, if a significant drop in CSI corresponds to a noticeable degradation in the quality of the wireless communication link, a potential causal link between the two may be determined.

In some examples, the spatial relationship between the detected CSI change event and the affected wireless communication link is used to determine a correlation. For examples, if the CSI change event occurs near the access point experiencing the change in quality of the wireless communication link, control circuitry may determine a localized influence on the network. On the other hand, if the change event originates from a distant location with no apparent impact on nearby access points, the correlation may be weaker.

In some examples, the frequency or recurrence pattern of CSI change events and changes in the quality of a wireless communication link contribute to establishing a correlation. If repetitive occurrences of CSI changes consistently precede changes in the quality of a wireless communication link, control circuitry may determine a causal relationship between the two phenomena. Conversely, sporadic or inconsistent patterns may indicate less significant correlation.

In some examples, control circuitry may employ statistical analysis techniques to determine correlation. Control circuitry may determine a correlation by quantifying the relationship between changes in CSI and changes in the quality of a wireless communication link through statistical measures such as correlation coefficients or regression analysis.

In some examples, if no correlation is identified, the process reverts to its initial phase. In some examples, if a correlation is established, the control circuitry proceeds to execute an action based on the detected correlation.

In some examples, control circuitry may initiate adaptive network reconfiguration based on the identified correlation. This may involve reallocating resources or adjusting network parameters to adapt to changing environmental conditions reflected in changes to CSI (e.g., reallocating network traffic to a different access point in a wireless mesh network). For example, if a first access point detects an obstruction, whether temporary or permanent, it may share its CSI matrix (or a condensed version) with a neighboring access point. If a second access point exhibits better throughput and less obstruction in its vicinity, user devices connected to the first access point may be migrated to the second access point.

In some examples, if a correlation is established, control circuitry initiates corrective measures to mitigate the impact of detected issues on network performance. For example, if the correlation indicates a decline in the quality of a wireless communication link due to interference or signal degradation captured by changes in CSI, control circuitry may adjust transmission parameters or channel allocations to optimize signal reception and minimize disruptions.

In some examples, control circuitry may trigger automated alerts or notifications to network administrators or user devices regarding the detected correlation. The notifications may provide real-time updates on network conditions. For example, if a correlation suggests potential signal interference affecting link quality, a user device may receive notifications prompting an investigation and to rectify the interference source promptly (as depicted, by way of example, in FIG. 2).

In some examples, control circuitry may leverage data analytics and machine learning algorithms to derive insights from correlations between changes in CSI and changes in the quality of a wireless communication link. By analyzing historical data and patterns, control circuitry may predict future network behavior and proactively implement optimization strategies to preemptively address potential issues. For example, machine learning models trained on correlated CSI and wireless communication quality data may forecast network performance trends and recommend proactive adjustments to maintain optimal operation.

In some examples, in cases where correlations indicate spatial dependencies between changes in CSI and the quality of a wireless communication link, control circuitry may generate visual representations such as network maps to illustrate these relationships. These maps may highlight areas of potential signal interference or coverage gaps based on correlated CSI and wireless communication quality data, prompting actions such as the repositioning of signal repeaters or antenna.

In some examples, an access point (e.g., access points and devices discussed in FIGS. 1-4) utilize CSI matrix-based Wi-Fi sensing to perform imaging to create a depiction of any obstructing objects. By analyzing angle, velocity, and range data associated with the obstructing object, the access point may determine whether it is a static obstacle impeding communication with devices (e.g., devices 302). Control circuitry may communicate to a user device, providing information on scenarios where an access point may be placed in a cabinet or on a shelf surrounded by objects, hindering optimal communication.

In some examples, access points equipped with inertial measurement unit (IMU) sensors can determine their orientation to detect anomalies like being upside down, which may adversely affect MIMO antenna performance and throughput.

In some examples, the priority of alerts may be adjusted based on the proximity of the obstructing object. Utilizing methods such as those outlined in FIG. 5, the distance between an access point and obstruction may be computed. If the object is in close proximity (e.g., less than 0.2 m), the alert priority may be increased, whereas for objects farther away (e.g., beyond 1 m), the alert level may be lower.

In some examples, thermal drift analysis is employed to determine if an access point is heating up due to an obstruction or being placed in a confined space like a glass shelf etc. This may be achieved through embedded temperature sensors within the access point or materials capable of heat measurement via radio frequencies. Temperature changes may lead to alerts or prompts to a user device when correlated to a change in the quality of a wireless communication link.

In some embodiments, when an AP enters "Activity Detection" mode, state information (including Channel Quality) is written to non-volatile memory such as EEPROM. If a customer disconnects power from the mesh Wi-Fi AP in order to change its location, then the knowledge that the AP was experiencing activity in its vicinity prior to disconnecting power helps retain the key information needed to message the customer. After the AP boots up and initializes, it enters "Activity Detection" mode. Once activity around it dies down ("Activity Detection" mode is exited), it compares its Channel Quality with the Channel Quality saved in non-volatile memory. Clock synchronization allows the system to determine the activity time before and after power disconnection, as well as the time that the AP was not powered. These metrics are provided to the customer in the message or alert, for example.

In some embodiments, the AP monitors channel quality to the fronthaul network to devices/clients. If it observes that the composite signal quality to the client is negatively affected primarily by the backhaul link, the system may remind the customer through a message that the bandwidth to the client has reduced possibly due to the physical activity that affected the mesh AP. On the other hand, if it determines that the composite signal quality is negatively affected primarily due to the fronthaul link, then the system may send a reminder message to the customer that the new arrangement may not be ideal for clients. Positive feedback may also be sent if physical activity improves the backhaul/fronthaul links.

In some embodiments, AP may also imaging using CSI matrix-based Wi-Fi sensing. This will enable to sketch out a rudimentary image of the blocking object. Using angle, velocity and range data collected for the blocking object, we will compute whether this object is a static object that is interfering with the communication of the AP with other non-APs (STAs) or APs. We may use this information during our proactive communication with the customer, to alert them to instances where the AP has been placed in a cabinet or on a shelf with other objects depriving them of available space for better communication. The size of the image detected may also be used as a threshold for the communication with the customer since APs close to or blocked with large objects (such as metal items such as refrigerators, desktops, TVs or microwave ovens) will negatively affect throughput. If the received known packets are unable to give a rudimentary image of the object, then a change in the Angle of Arrival (AoA) of the strongest (typically LoS) signal derived from the CSI matrix may be used determine whether the router was blocked.

In some embodiments, once an AP1 has detected that it has been blocked by an object either temporarily or permanently, it can share its CSI matrix (or a compressed summarized form) with a neighboring AP2. If the neighboring AP2 has a better current throughput then AP1 and CSI matrix is indicating less blocking or moving objects around it, STAs connected to AP1 may be proactively roamed to AP2, till to the time that the customer takes action as a response to the proactive communication that it was sent. AP2 can decode AP1's CSI matrix and compare to its own collected CSI matrix data whether similar object is also being sensed in the vicinity and whether this object is static or moving. Furthermore, for APs that have IMU sensors installed, using such sensor data, in addition to the blocking, the disclosed techniques may also compute the orientation of the AP to check its orientation such as if it is upside down. If so, that means its MIMO antennas will not be able to deliver high throughput and this may need to be communicated to the customer.

In some embodiments, severity of the alert can be calibrated by how close the blocking object is. Techniques known in the art via 802.11bz can be used to compute the distance of the blocking object from the AP. If the blocking object is very close, less than 0.2 m, alert will be high versus moderate (0.5 m) or minor (if the blocking object is more than 1 m away).

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

sampling values of a physical characteristic of a wireless communication link between a first access point and a second access point;

detecting a first time period of physical activity in a vicinity of the first access point by analyzing the sampled values of the physical characteristic;

sampling, over a second time period, a value indicative of a quality of the wireless communication link, wherein the second time period is longer than the first time period and encompasses the first time period;

comparing values of the quality of the wireless communication link sampled before and after the first time period;

in response to the comparison finding that the values of the quality of the wireless communication link sampled before and after the first time period differ by more than a threshold amount, generating an alert to indicate that physical activity occurs at a similar time to a persistent change in the quality of the wireless communication link.

2. The method according to claim 1, wherein the detecting the first time period of physical activity in the vicinity of the first access point comprises detecting a first time of the first time period of physical activity in the vicinity of the first access point by detecting an increase in a volatility in the sampled values of the physical characteristic.

3. The method according to claim 2, wherein the detecting the first time period of physical activity in the vicinity of the first access point comprises detecting a second time of the first time period of physical activity in the vicinity of the first access point by detecting a decrease in the volatility in the sampled values of the physical characteristic.

4. The method according to claim 1, wherein the physical characteristic of the wireless communication link comprises channel state information.

5. The method according to claim 4, wherein the channel state information comprises one or more channel state information matrices having channel state values for each of a plurality of frequency bands and/or antenna pairs, the method further comprising:

analyzing the channel state information to classify a size, nature, or location of an obstruction to wireless communication between the first access point and the second access point;

wherein the generated alert includes information regarding the size, nature, or location of the obstruction.

6. The method according to claim 1, wherein the value indicative of the quality of the wireless communication link comprises an error rate.

7. The method according to claim 1, further comprising:

increasing a frequency of sampling the physical characteristic of the wireless communication link in response to detecting an onset of the first time period of physical activity in the vicinity of the first access point; and decreasing the frequency of sampling the physical characteristic of the wireless communication link in response to detecting an end of the first time period of physical activity in the vicinity of the first access point.

8. The method according to claim 1, wherein the value indicative of the quality of the wireless communication link comprises a quality of communication with a wireless device communicating via the wireless communication link between the first access point and the second access point.

9. The method according to claim 1, wherein the alert includes wireless network topology data for rendering by a user device to provide a network map indicative of the location of the first access point in the wireless network topology.

10. The method according to claim 1, further comprising storing at least some of the sampled values of the quality of the wireless communication link in persistent memory.

11. A system comprising control circuitry configured to:

sample values of a physical characteristic of a wireless communication link between a first access point and a second access point;

detect a first time period of physical activity in a vicinity of the first access point by analyzing the sampled values of the physical characteristic;

sample, over a second time period, a value indicative of a quality of the wireless communication link, wherein the second time period is longer than the first time period and encompasses the first time period;

compare values of the quality of the wireless communication link sampled before and after the first time period;

in response to the comparison finding that the values of the quality of the wireless communication link sampled before and after the first time period differ by more than a threshold amount, generate an alert to indicate that physical activity occurs at a similar time to a persistent change in the quality of the wireless communication link.

12. The system according to claim 11, wherein the detecting the first time period of physical activity in the vicinity of the first access point comprises detecting a first time of the first time period of physical activity in the vicinity of the first access point by detecting an increase in a volatility in the sampled values of the physical characteristic.

13. The system according to claim 12, wherein the detecting the first time period of physical activity in the vicinity of the first access point comprises detecting a second time of the first time period of physical activity in the vicinity of the first access point by detecting a decrease in the volatility in the sampled values of the physical characteristic.

14. The system according to claim 11, wherein the physical characteristic of the wireless communication link comprises channel state information.

15. The system according to claim 14, wherein the channel state information comprises one or more channel state information matrices having channel state values for each of a plurality of frequency bands and/or antenna pairs, wherein the control circuitry is further configured to:

analyze the channel state information to classify a size, nature, or location of an obstruction to wireless communication between the first access point and the second access point;

wherein the generated alert includes information regarding the size, nature, or location of the obstruction.

16. The system according to claim 11, wherein the value indicative of the quality of the wireless communication link comprises an error rate.

17. The system according to claim 11, wherein the control circuitry is further configured to:

increase a frequency of sampling the physical characteristic of the wireless communication link in response to detecting an onset of the first time period of physical activity in the vicinity of the first access point; and decrease the frequency of sampling the physical characteristic of the wireless communication link in response to detecting an end of the first time period of physical activity in the vicinity of the first access point.

18. The system according to claim 11, wherein the value indicative of the quality of the wireless communication link comprises a quality of communication with a wireless device communicating via the wireless communication link between the first access point and the second access point.

19. The system according to claim 11, wherein the alert includes wireless network topology data for rendering by a user device to provide a network map indicative of the location of the first access point in the wireless network topology.

20. The system according to claim 11, wherein the control circuitry is further configured to store at least some of the sampled values of the quality of the wireless communication link in persistent memory.

* * * * *